United States Patent [19]

Joseph et al.

[11] Patent Number: 4,709,908
[45] Date of Patent: Dec. 1, 1987

[54] STABILIZER DEVICE FOR AUTOMOBILE SUSPENSION SYSTEMS

[76] Inventors: Gerald Joseph, 1275 15th St., Fort Lee, N.J. 07024; Joseph Berta, 827 Linden Ave., Ridgefield, N.J. 07657

[21] Appl. No.: 800,957

[22] Filed: Nov. 22, 1985

[51] Int. Cl.$^4$ ............................................. F16F 5/00
[52] U.S. Cl. .................................. 267/140.4; 248/638
[58] Field of Search ..................... 267/8 R, 33, 34, 35; 280/140.1, 140.3, 711, 140.4; 188/268; 248/562, 599, 619, 638

[56] References Cited

U.S. PATENT DOCUMENTS

| 2,427,927 | 9/1947 | Schutte | 267/34 X |
| 2,892,636 | 6/1959 | Walker | 267/34 X |
| 3,667,707 | 6/1972 | Mui | 248/638 X |

FOREIGN PATENT DOCUMENTS

| 913024 | 4/1954 | Fed. Rep. of Germany | 280/711 |
| 1086139 | 7/1960 | Fed. Rep. of Germany | 267/34 |
| 555191 | 1/1957 | Italy | 280/711 |
| 861127 | 2/1961 | United Kingdom | 267/34 |

Primary Examiner—Duane A. Reger
Attorney, Agent, or Firm—Arthur L. Plevy

[57] ABSTRACT

There is disclosed a stabilizer suspension device of the type which operates in conjunction with an airbag. The stabilizer device is characterized by having a housing or cage for containing the airbag which housing comprises a top annular seat member and a bottom annular seat member. The top and bottom members are coupled together by means of telescopic vertical arm assemblies which assemblies operate to accommodate motion in the vertical plane due to the telescoping coupling of the same and further operate to surround the airbag and hence to retain the same within the housing configuration.

10 Claims, 4 Drawing Figures

STABILIZER DEVICE FOR AUTOMOBILE SUSPENSION SYSTEMS

BACKGROUND OF THE INVENTION

This patent relates to a stabilizer device for an automobile or other vehicle and more particularly to a stabilizer device having an elastic inflatable bag.

The prior art is cognizant that inflatable rubber or rubber-like bags positioned within a coil spring function to provide axial compression and have been used as spring booster devices or suspension devices in automobiles. The prior art contains a number of various patents which show the use of elastomeric air cells incorporated together with springs and other devices to provide stabilizing operation.

See for example, U.S. Pat. No. 2,359,047 issued on Nov. 4, 1958 to F.B. Easton. This patent shows a spring suspension for an automobile where rubber air cells are employed in conjunction with the suspension system. In any event, the air cells in this particular application are held by means of flange plates which are vulcanized to the air cells.

U.S. Pat. No. 2,921,781 entitled SELECTIVELY VARIABLE PRESSURE APPARATUS... by D. M. Pemberton, issued on Jan. 19, 1960. This patent shows an inflatable rubber bag which is mounted between a pair of springs and coacts with a bottom plate having a wall deforming portion. The apparatus is a spring booster or stabilizer for automobiles or other vehicles.

U.S. Pat. No. 2,969,974 entitled SPRING BOOSTER DEVICE issued on Jan. 31, 1961 to D. M. Pemberton. This patent discloses a stabilizer device which includes an inflatable rubber bag positioned within a coil spring. The airbag is convoluted and maintains the shape to allow it to be positioned between two movable members to oppose their movement towards one another over a wide range of resistance values.

Still other patents as U.S. Pat. No. 3,522,940 and U.S. Pat. No. 3,727,899 show other devices which use springs in conjunction with plastic or rubber bags for stabilizing or suspension systems in various types of vehicles. In any event, as one can ascertain from the prior art, the use of a spring or a similar element which surrounds the bag makes for a relatively expensive assembly. Furthermore, the spring is subjected to wear and corrosion and hence such springs which surround the air bags have to be replaced or continuously monitored.

Furthermore, based on the spring action, there is a tendency of such springs to damage the bag due to the constant pressure exerted by the spring on the bag.

It is, therefore, an object of the present invention to provide a stabilizer arrangement utilizing an elastomeric air bag which stabilizer arrangement eliminates the necessity for a spring and which arrangement is economical to fabricate and reliable in operation.

BRIEF DESCRIPTION OF THE PREFERRED EMBODIMENT

A stabilizer suspension housing for enclosing an elastomeric inflatable bag for use as a suspension assembly in a vehicle, comprising top and bottom annular seat members each of said members having corresponding extending arms which telescopically engage to enable said top and bottom seat members to reciprocate with respect to one another with the space between said top and bottom seats as coupled together by said arms forming an enclosure for said elastomeric inflatable bag.

DETAILED DESCRIPTION OF THE DRAWINGS

Figure 1:
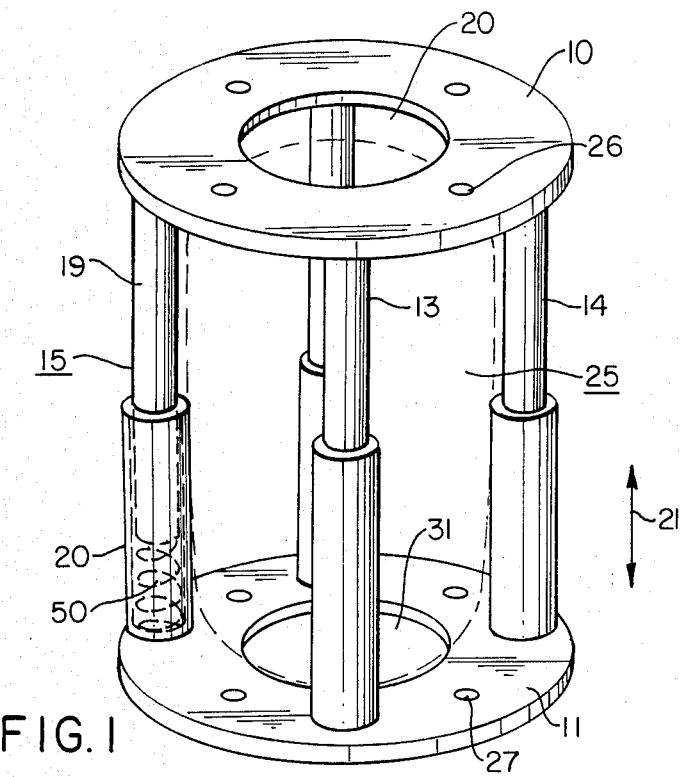
FIG. 1 is a perspective plane view of a stabilizer device according to this invention.

Referring to FIG. 1, there is shown a stabilizer apparatus according to this invention.

As seen in FIG. 1, the apparatus comprises a cage apparatus which consists of a top annular seat 10 coupled to a bottom annular seat 11 via vertical telescoping members 13, 14 and 15. The vertical members as 15 consists of a top arm 19 of a smaller diameter than the bottom arm 20. The top arm is slidably mounted in the bottom arm 20 to allow the entire cage member to reciprocate or move in the direction of arrow 21. Located within the central cavity formed between the arms is an airbag 25 shown in dashed line configuration.

As shown in FIG. 1, the bottom extending arms as arms 20 which extend from the bottom seat assembly 11 are hollow and the top extending arms which extend from the top seat assembly 10 are solid and have their ends directed into the hollows of the bottom arms as 20. It is, of course, understood that the top arms 19 can be hollow for accommodating solid bottom arms as 20 whereby the same operation would be achieved.

The top and bottom seats may include apertures as 26 to allow the seats to be secured, for example, to the frame of an automobile. The entire assembly may be utilized between the A-frame of an automobile and the axle in order to provide suspension to the vehicle. The assembly may be fabricated from a strong plastic and, as such, eliminates the metal coil springs associated with prior art devices. It is noted that the entire assembly will move or reciprocate in the direction of the arrow 21 causing pressure to be exerted on the airbag through the top and bottom seats 10 and 11. Each seat as 10 and 11 as indicated has a central aperture as 30 and 31. The central apertures provide a seating surface for the airbag to firmly hold the airbag and maintain the airbag in the vertical direction by providing a positive seat for the airbag.

Figure 2:
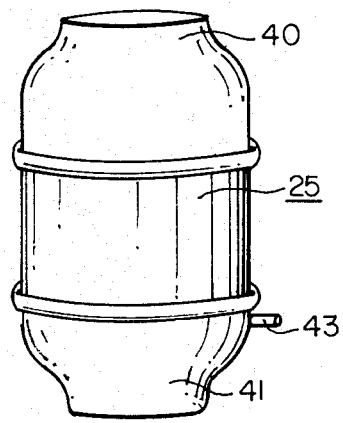
FIG. 2 is a front view of an airbag which may be employed with the stabilizer device of FIG. 1.

As such, the airbag may take the shape as shown in Figure 2 with the top sections 40 and 41 of a configuration to coact with the apertures 30 and 31 in the top and bottom seats 10 and 11. The airbags may also be any of the conventional type of devices which are presently being marketed.

The airbag, as indicated in FIG. 2, is made from an elastomeric material which may, for example, be a vulcanized rubber and includes a valve 43 to allow a user to inflate an airbag to a desired pressure. In this manner, the amount of shock absorption afforded by the assembly is a function of the air pressure accommodated by the inflatable bag. The functions of such bags, as indicated above, are well known and many suitable bags are commercially available.

As one can ascertain from the patent cited in The Background of the Invention, there are many different types of airbags which are available to the public and the particular configuration as depicted in FIG. 1 is capable of handling any of the various types. In order to provide further force cushioning, each vertical arm may contain a small spring as spring 50 associated with arm 15 which spring is located in the aperture of the bottom arm section 20 and which further serves in conjunction with the airbag to provide great resistance against forces.

Figure 3:
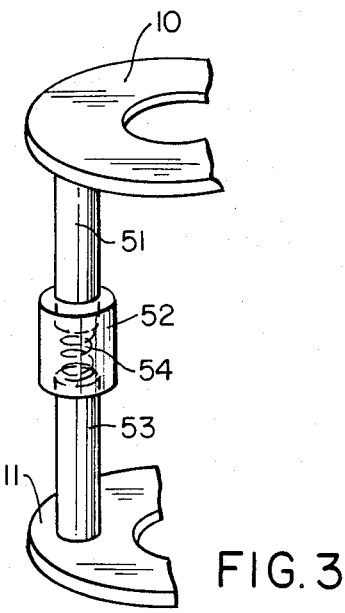
FIG. 3 is a partial view of an alternate embodiment of a stabilizer arm assembly employed with this invention.

Referring to FIG. 3, there is shown an alternate embodiment of an arm for the support structure of FIG. 1. In the embodiment depicted in FIG. 3, a top arm 51 is secured to the top seat 10 and is directed into a central sleeve member 52. The central sleeve member 52 also receives the bottom arm 53 which bottom arm is coupled to the bottom seat 11. A spring 54 is located within the central hollow of the sleeve 52 and may be secured at the center to the sides of the aperture in member 52.

The sleeve member 52 as seen from FIG. 3 is cylindrical having a longitudinal aperture to enable insertion of arm 51 into one end and arm 52 into the opposing end. As indicated, the spring 54 which is secured within the sleeve 52 abuts against the bottom surfaces of arms 51 and 53 to provide further shock absorbing characteristics.

In this manner both arms can move in the vertical direction as shown. As indicated above, the arms may be fabricated from a relatively pliable but strong plastic and hence are also capable of providing motion in the horizontal plane by the flexing or bending of the arms. This type of movement is typically encountered in vehicle operation and is accommodated by the assembly shown in FIG. 1.

Figure 4:
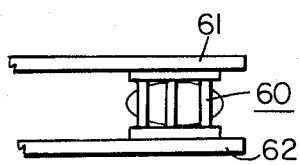
FIG. 4 is a partial view showing the suspension stabilizer device located between two movable members of a vehicle.

Referring to FIG. 4, there is shown the suspension stabilizer device 60 as particularly depicted in FIG. 1 located between two movable members as 61 and 62. Member 61, for example, may be the A-Frame of a vehicle while member 62 may be an axle or a suspension rod. As is well known and as is explained extensively in the prior art, such devices have been employed to serve as a suspension unit where the device extends between two spaced movable members as members 61 and 62 which members may be the frame of the vehicle and a suspension member so as to maintain the members in a spaced relation during the operation of a vehicle. Accordingly, the suspension unit may be employed as an adjunct to a suspension coil or shock absorber which are typically supplied by the manufacturers of a vehicle.

These suspension deices enable the vehicle to handle road shocks in a safe manner while further enabling the vehicle to increase its load capacity.

Essentially, the above described apparatus provides a unique housing for an airbag and operates without the use of surrounding springs as those found in the prior art. The assemblies consisting of the top and bottom seats and telescoping vertical arms is relatively inexpensive to fabricate, can be made from a suitable plastic and, therefore, circumvents the problems with prior art devices of the type employing coil springs.

As can be seen from FIG. 1, the entire top assembly which includes the top seat 10 and top arm portions as 19 can be fabricated integrally as can the bottom assembly. This can be accommodated by utilizing a simple mold as those typically employed in plastic fabrication techniques.

While FIG. 1 shows four arms, each of which is spaced 90 degrees about the periphery of the annular members, it is understood that 5, 6 or more support arms may be employed as well as to provide further rigidity to the structure.

We claim:

1. A stabilizer suspension housing for enclosing an elastomeric inflatable bag for use as a suspension assembly in a vehicle, comprising:

top and bottom annular seat members spaced apart, one from another, residing in relatively congruent relationship, each of said members having a central aperture and corresponding extending arms which telescopically engage to enable said top and bottom seat members to reciprocate with respect to one another with the space between said top and bottom seat members being coupled together by said arms forming an enclosure for said elastomeric inflatable bag, with end portions of said bag when accommodated within said housing being positioned within each central aperture of said annular seat members.

2. The stabilizer suspension housing according to claim 1, wherein said top and bottom annular seat members are fabricated from a plastic with said extending arms integrally formed therewith.

3. The stabilizer suspension housing according to claim 1, further including a plurality of apertures on the surface of said top and bottom seat members for securing the same to a vehicle frame.

4. The stabilizer suspension housing according to claim 1, wherein said extending arms from one of said seat members are hollow having an opened end to enable a corresponding arm from said other seat member to be inserted therein to form a telescoping assembly.

5. The stabilizer suspension housing according to claim 4, further including spring biasing means located within the hollow of said hollow extending arms associated with said one seat member.

6. The stabilizer suspension housing according to claim 1, further including a tubular sleeve member associated with a pair of extending arms with one arm of said pair extending from said top seat member and the other arm of said pair extending from said bottom seat member, with said arms inserted into said sleeve member at opposite ends to provide a telescoping assembly.

7. The stabilizer suspension housing according to claim 6, further including a spring located in said sleeve member and operative to exert a pressure on the ends of said extending members when accommodated by said sleeve.

8. A stabilizer suspension device for positioning between two spaced members capable of moving with respect to one another, such as a vehicle frame and an axle, comprising:

a top annular seat member of a planar configuration and having depending from a common surface a series of spaced apart arms, a bottom annular seat member of a planar configuration and relatively congruent to said top member and having depending from a common surface a series of corresponding spaced arms, and means for telescopically coupling an associated arm of said top member with an associated arm of said bottom member to form a telescoping assembly, an inflatable air bag located between said top and bottom seat members and surrounded by said telescopically coupled arm assemblies to enable said bag to compress and expand according to forces exerted on said top and bottom seat members, with said inflatable air bag having top and bottom surface sections dimensioned to fit within the central apertures of said top and bottom annular seat members.

9. The stabilizer suspension device according to Claim 8, wherein said means for telescopically coupling said associated arms comprises a longitudinal hollow cavity included in one of said arms to enable said corresponding arm to be inserted therein to form a telescoping joint assembly.

10. The stabilizer suspension device according to Claim 8, wherein said means for telescopically coupling said associated arms comprises a tubular sleeve member with one end of said sleeve member accommodating one of said extending arms of one of said seat members and said other end accommodating said corresponding extending arm of said other seat member to telescopically couple said members together.

* * * * *